Figure 1:
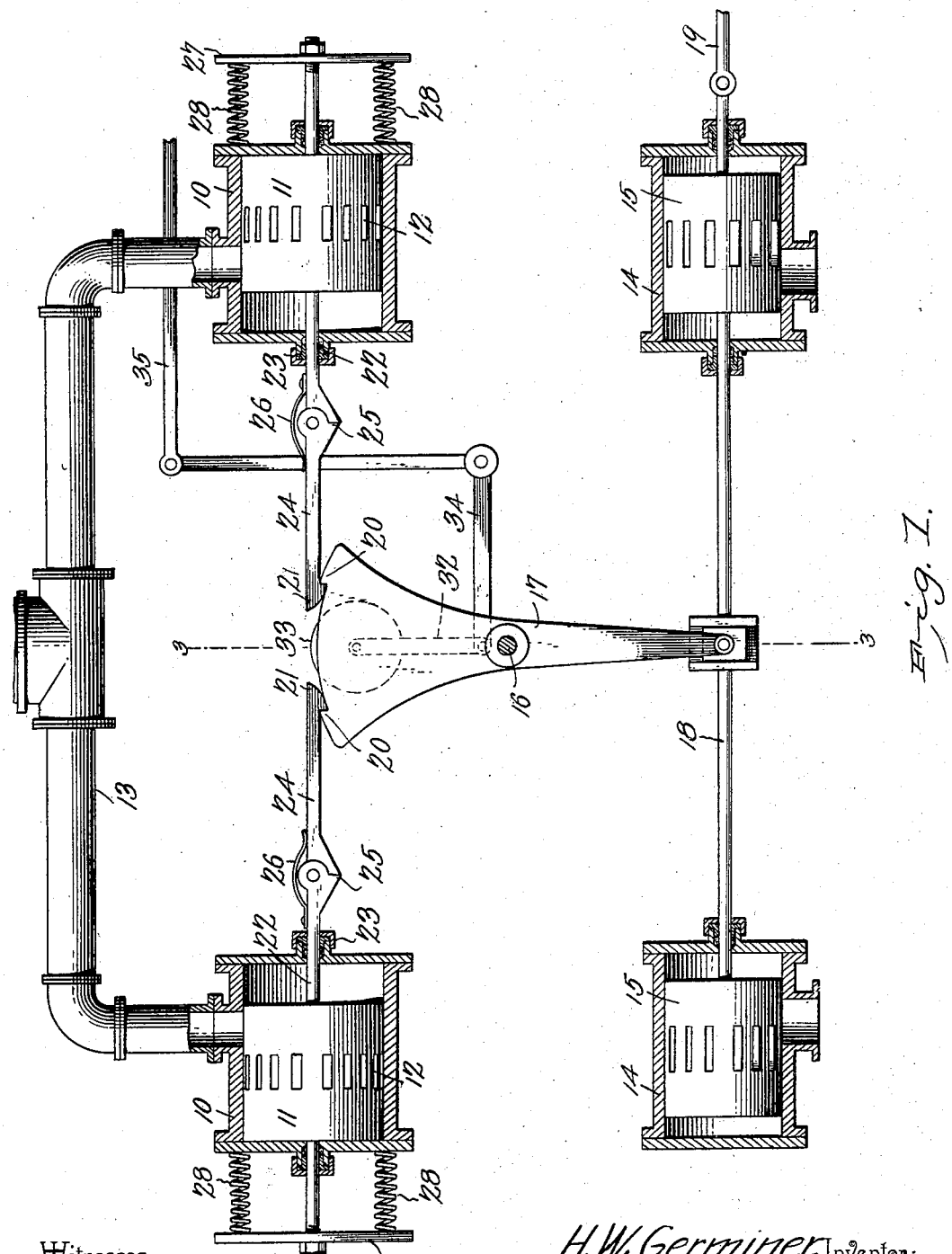

No. 722,970. PATENTED MAR. 17, 1903.
H. W. GERMINER.
VALVE FOR STEAM ENGINES.
APPLICATION FILED NOV. 1, 1902.
NO MODEL. 2 SHEETS—SHEET 1.

Witnesses
E. H. Stewart
Jno. Parker

H. W. Germiner, Inventor;
by C. A. Snow & Co.
Attorneys

No. 722,970. PATENTED MAR. 17, 1903.
H. W. GERMINER.
VALVE FOR STEAM ENGINES.
APPLICATION FILED NOV. 1, 1902.
NO MODEL. 2 SHEETS—SHEET 2.
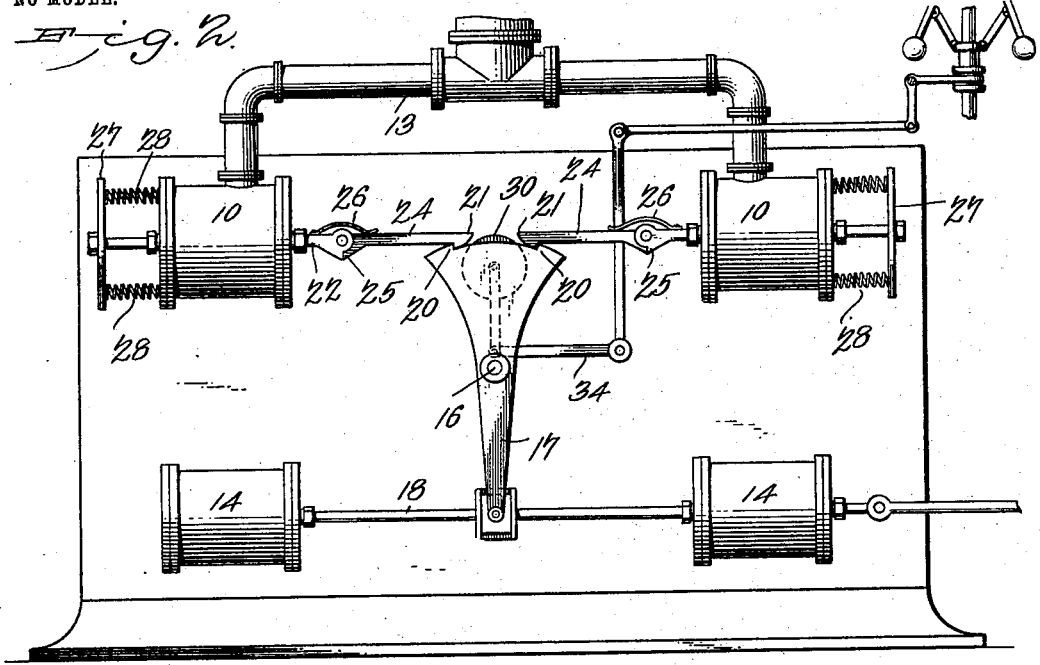
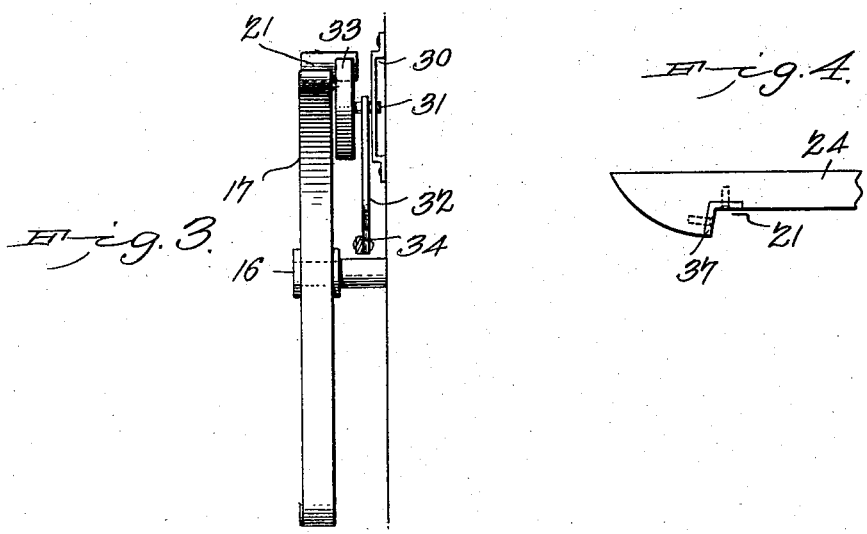
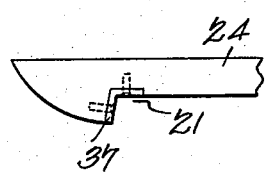

UNITED STATES PATENT OFFICE.

HENRY WM. GERMINER, OF NEW BOSTON, OHIO.

VALVE FOR STEAM-ENGINES.

SPECIFICATION forming part of Letters Patent No. 722,970, dated March 17, 1903.

Application filed November 1, 1902. Serial No. 129,715. (No model.)

*To all whom it may concern:*

Be it known that I, HENRY WM. GERMINER, a citizen of the United States, residing at New Boston, in the county of Scioto and State of Ohio, have invented a new and useful Valve for Steam-Engines, of which the following is a specification.

The invention relates to certain improvements in valve-operating mechanism for steam-engines, and has for its principal object to provide a mechanism of simple construction in which the number of operating parts are reduced to a minimum, a further object being to simplify and improve the mechanism for controlling the point of cut-off and to provide a mechanism quickly responsive to movements of the governor.

With these and other objects in view the invention consists in the novel construction and arrangement of parts hereinafter described, illustrated in the accompanying drawings, and particularly pointed out in the appended claims, it being understood that various changes in the form, proportions, size, and minor details of the structure may be made without departing from the spirit or sacrificing any of the advantages of the invention.

In the accompanying drawings, Figure 1 is an elevation, partially in section, of a valve-operating mechanism constructed in accordance with my invention. Fig. 2 is an elevation of the same, illustrating the general arrangement of the parts in connection with the cylinder of an engine. Fig. 3 is a transverse sectional elevation of the same on the line 3 3 of Fig. 1. Fig. 4 is a detail view of the hooked end of one of the valve-rods.

Similar numerals of reference are employed to indicate corresponding parts throughout the several figures of the drawings.

The mechanism forming the subject of the present invention is designed to operate the valves of engines of that class of which the cylinder is provided with two separate steam-inlet valves and two exhaust-valves, all operated from a central rod or plate having an operative connection with an eccentric on the shaft of the engine. The valves employed may be of any desired construction; but it is preferred to employ hollow cylindrical valves having a plurality of ports or passages and each disposed within a separate valve-chamber.

In the drawings, 10 indicates the steam-chests or valve-chambers, in which are arranged cylindrical steam-valves 11, having ports 12, which may be brought into alinement with a steam-port in communication with a main steam-pipe 13 for the purpose of admitting steam to the cylinder. The exhaust-valve chests 14 contain cylindrical exhaust-valves 15 of a construction similar to that of the steam-inlet valves.

Projecting from one side of the engine-cylinder is a stud or pin 16, on which is mounted a rocker-arm 17, taking the place of the wrist-plate of the ordinary "Corliss" valve-gear. The two exhaust-valves 15 are connected together by a valve-rod 18, extending through suitable stuffing-boxes in the valve-chest and connected at one end to an eccentric-rod 19, the eccentric acting directly on the two exhaust-valves and motion being communicated to the rocker-arm by means of the valve-rod 18.

The upper end of the rocker-arm 17 is curved on a line concentric with the center of the stud 16, and the central portion of the upper end of the arm is recessed to form a pair of shoulders 20 for engagement with the hooked ends 21 of the rod connections leading to the steam-inlet valve.

The valve-rods 22 extend through both ends of the valve-chambers, suitable stuffing-boxes 23 being employed to prevent the escape of steam, and the inner end of each rod is pivotally connected to a hook-bar 24, the connection being in the form of a hinge 25, having abutting shoulders for preventing excessive downward movement of the hook 24. The hook and rod are normally maintained in horizontal alinement by a small leaf-spring 26, and the hooked end of each of the bars projects over the upper end of the rocker-arm, the hooks being alternately engaged by the shoulders 20 to move the steam-valve ports into alinement with the steam-inlet and the cylinder ports. The outer end of each valve-rod carries a cross-bar or yoke 27, and between the cross-bar and the adjacent head of the valve-chest are placed compression-springs 28, which serve to return the steam-valve to closed position when released from the shoulder of the rocker-arm.

At the rear of the rocker-arm is arranged a vertically-disposed slotted guide-way 30, which may be secured to the sides of the cylinder of the engine and serves to receive a stud 31, arranged at the upper end of a link 32 and carrying a governor-regulated cut-off disk 33. The lower end of the link 32 is connected by a bell-crank lever 34 and rod 35 to a suitable form of governor operated by the engine and controlling the vertical position of the disk 33. The disk is arranged in the same vertical plane as the axis of the stud 16, and a portion of its periphery normally extends slightly above the recessed portion of the rocker-arm and is alternately engaged by the curved outer ends of the hook-bars 24 and acts to release said hook-bars from engagement with the shoulders 20 and permit the springs 28 to return the valves to closed position. The vertical position of the disk is regulated wholly by the governor, and as the speed of the engine increases the disk is elevated to expose a greater portion of its periphery above the rocker-arm, and thus engage and release the hook-bars before the valves have been fully opened. In this manner the point of cut-off can be accurately regulated, while the disk, being freely revoluble, moves with the hook-bars and prevents undue wear of either the bars or the disk. Owing to the free movement of the disk, wear at any one point is prevented and the whole of its perimeter may be utilized as a cut-off cam.

The shoulder-engaging portions of the hook members are preferably provided with wear-blocks 37, as shown in Fig. 4, and said blocks may be formed of wood or of any suitable material to prevent the noise incident to the engagement of the shoulders with the hooks.

Having thus described the invention, what is claimed is—

1. The combination in a valve-operating mechanism, of the valve-rods, hook-bars connected thereto, means for engaging and actuating said hook-bars, and a governor-regulated disk independent of the hook-bar-actuating means and forming a cut-off cam for releasing said hook-bars.

2. The combination with a valve and valve-rod, of a hook-bar, a hook-bar engaging and actuating means, a disk for engaging and releasing the hook, said disk being independent of the hook-bar-actuating means, and means for adjusting the position of the disk in accordance with the speed of the engine.

3. The combination in a valve-operating mechanism, of a valve-rod, a hook-bar connected thereto, means for engaging and moving the hook-bar, and a governor-regulated cut-off cam wholly independent of the hook-bar-actuating means and adjustable in a plane at an angle to the plane of movement of the hook-bar and adapted to release said hook-bar from its actuating means.

4. The combination in a valve-operating mechanism, of a valve-rod, a hook-bar connected thereto, a rocker-arm having a shoulder for engaging the hook-bar, and a vertically-adjustable cam wholly independent of the rocker-arm and disposed in the path of movement of the hook-bar and adapted to release the same from the shoulder.

5. The combination in a valve-operating mechanism, of a valve-rod, a hook-bar connected thereto, a rocker-arm having a shoulder for engaging the hook-bar, and a roller arranged in the path of movement of the hook-bar and adapted to release the same from the shoulder, said roller being independent of the rocker-arm.

6. The combination in a valve-operating mechanism, of a valve-rod, a hook-bar connected thereto, a rocker-arm having a shoulder for engaging the hook-bar, a roller independent of the rocker-arm and arranged in the path of movement of the hook-bar and adapted to release the same from the shoulder, and a governor operatively connected to said roller and serving to adjust the same in a plane at an angle to the plane of movement of the hook-bar.

7. The combination in a valve-operating mechanism, of a pair of valve-rods, hook-bars carried thereby, a rocker-arm having a recessed central portion forming a pair of oppositely-facing shoulders for engagement with the hook-bars, and a governor-regulated cut-off cam disposed centrally between the hook-bars and serving to alternately disengage said hook-bars from the shoulders.

8. The combination in a valve-operating mechanism, of a valve-rod, a hook-bar, a hinge connection between the rod and bar having abutting shoulders for limiting the movement of the bar, a spring for maintaining the bar in normal position, and means for operating said hook-bar.

9. The combination in a valve-operating mechanism, of a pair of steam-inlet valves, rods secured thereto, hook-bars carried by the rod, a pair of exhaust-valves, a valve-rod connecting the same, means for reciprocating said valve-rod, a pivotally-mounted rocker-arm connected at one end to the exhaust-valve rod and provided with shoulders for engaging the hook-bars, a cut-off cam comprising a vertically-adjustable disk, means for guiding said disk, a governor, and means for connecting the governor to the disk.

In testimony that I claim the foregoing as my own I have hereto affixed my signature in the presence of two witnesses.

HENRY WM. GERMINER.

Witnesses:
 H. B. ADAMS,
 W. A. TIMSEY.